United States Patent [19]

Miyamoto et al.

[11] Patent Number: 4,864,608
[45] Date of Patent: Sep. 5, 1989

[54] ECHO SUPPRESSOR

[75] Inventors: Takanori Miyamoto, Fuchuu; Sumie Nakabayashi, Yokohama; Yoshiro Suzuki, Tama; Kazuhiro Kondo, Kokubunji; Shinichi Niina, Tokorozawa, all of Japan

[73] Assignees: Hitachi, Ltd.; Hitachi VLSI Engineering Corporation, both of Tokyo, Japan

[21] Appl. No.: 84,323

[22] Filed: Aug. 10, 1987

[30] Foreign Application Priority Data

Aug. 13, 1986 [JP] Japan .................. 61-188455

[51] Int. Cl.$^4$ ............................................. H04B 3/20
[52] U.S. Cl. ...................................... 379/409; 370/321
[58] Field of Search ............... 379/388, 389, 390, 406, 379/407, 409; 370/32.1, 32

[56] References Cited

U.S. PATENT DOCUMENTS

| | | | |
|---|---|---|---|
| 3,896,273 | 7/1975 | Fariello | 379/406 |
| 4,029,912 | 6/1977 | Geigel et al. | 379/406 |
| 4,123,626 | 10/1978 | Munter | 379/406 |

FOREIGN PATENT DOCUMENTS

2040144 8/1980 United Kingdom ............... 370/32.1

Primary Examiner—Jin F. Ng
Assistant Examiner—Randall S. Vaas
Attorney, Agent, or Firm—Fay, Sharpe, Beall, Fagan, Minnich & McKee

[57] ABSTRACT

An echo suppressor for a communication system wherein a signal sent to a transmitting line is returned to a receiving line with some delay. The suppressor comprises an attenuator for attenuating the amplitude of a received speech signal. The transmitting speech signal amplitude level is compared to the amplitude of a receiving speech signal, and according to the result obtained, a signal for controlling the signal attenuation of the attenuator is generated. The delay time, until the attenuation control signal operates on the attenuator according to a change in the amplitude level of the receiving speech signal, is controlled. The controlled delay time is normally held at a predetermined maximum value, and is minimized when a change in amplitude of the receiving speech signal indicates a beginning of speech. Thus, an echo of the speech uttered by a near end user can be suppressed without impairing a beginning of the speech signal uttered by a far end user.

6 Claims, 7 Drawing Sheets

ECHO SUPPRESSOR

BACKGROUND OF THE INVENTION (1) Field of the Invention

The present invention relates to a speech signal processing system and, more particularly, to an echo suppressor for attenuating or eliminating an echo arising from a speech signal on a receiving line shifting round partly to a transmitting line and thus returning to a receiver which is a transmitting source of the speech signal in a two- to four-wire conversion circuit, for example, in a telephone communication system.

(2) Description of the Prior Art

Many a proposal has already been made on an art for decreasing or eliminating an echo caused by an impedance mismatching in a two- to four-wire conversion circuit (hybrid circuit) in the telephone communication system. In a typical echo suppressing art known already hitherto, an arrangement is such that an attenuator is inserted halfway of a receiving line, an echo signal coming back to a receiver of a near end user is attenuated by actuating the attenuator while the near end user is in talk, a talk commencement of a far end user is detected to remove the attenuator, thereby monitoring a speech signal level on both receiving line and transmitting line. There is known a method wherein a switch for cutting off an echo path is provided on the transmitting line, to control the switch according to the level of incoming signals The echo suppressing system of this kind is described, for example, in Japanese Patent Laid-Open No. 80029/1984 (U.S. Ser. No. 437,093) and Japanese Patent Laid-Open No. 124131/1985.

In the field of a digitized telephone communication system, a low bit rate speech transmission system wherein a redundancy information is removed when encoding the speech signal is known. A speech compression is attained by analyzing an input speech at every fixed period (frame cycle) of, for example, 10 to 20 msec., obtaining parameters indicating spectrum information and excitation information characterizing the speech, and transmitting these on a predetermined format. In this case, the excitation information is classified into amplitude information indicating a loudness of the speech, pitch information indicating an intonation of the speech, and information indicating a coarseness of the speech and the like, all of which are parametrized accordingly.

In such low bit rate speech transmission system, a relatively large transmission delay at, for example, several 10 msec. or so is involved for encoding and decoding the speech. Consequently, from employing a system wherein speech signal levels of the receiving line and the transmitting line are compared with each other, and an attenuator is inserted in the receiving line during the period of time when a near end user is in talk, an echo signal corresponding to a tail portion of the speech uttered by the user reaches a receiver as kept alive, and thus a speech quality is deteriorated.

SUMMARY OF THE INVENTION

An object of the invention is to provide an echo suppressor preferable for use on a communication system having a signal processing circuit involving a relatively large processing delay.

Another object of the invention is to provide an echo suppressor preferable for use on a telephone communication system having a relatively large processing delay, which is capable of suppressing an echo of a tail portion of a speech effectively.

A further object of the invention is to provide an echo suppression system preferable for use on a telephone system having a relatively large processing delay, which is capable of suppressing an echo component of a near end user without exerting an influence on a speech of a far end user.

In order to attain the aforementioned objects, the echo suppressor according to the invention which operates for a communication system with a speech signal sent to a transmitting line returned partly to a receiving line with some delay comprises:

a means for attenuating an amplitude of a receiving speech signal which is provided on a receiving line;

a means for comparing an amplitude level of a transmitting speech signal with an amplitude level of a receiving speech signal, generating a signal for controlling a signal attenuation according to a result obtained through comparison; and a means for controlling a delay until the aforementioned attenuation control signal operates on the attenuating means according to a change in amplitude level of the receiving speech signal.

More specifically, the aforementioned attenuation control means outputs the attenuation control signal so as to decrease the attenuation while the amplitude level of the transmitting speech signal is smaller than that of the receiving speech signal, or while a speech signal of the far end user is being received by the receiving line, and to increase the attenuation otherwise. On the other hand, the aforementioned delay control means retains the delay at a predetermined maximum value normally and operates to minimize the delay when a level of the receiving speech signal changes to indicate a beginning of the speech. During the predetermined period of time after the beginning of speech is detected, the delay is kept at the aforementioned minimum value, and after the lapse of this period the delay is retained at the maximum value.

The maximum value of delay is made to coincide with a processing delay until the echo component returns to the receiving line after the speech signal generated by a near end user is put out to the transmitting line. In case the invention is applied to a low bit rate speech transmission system provided with an encoder for compressing a transmission information and a decoder for decoding the compressed speech information, the maximum value of delay may be made to coincide almost with the delay required for signal processing by a pair of encoder and decoder. Thus, from controlling the delay until the attenuation control signal operates on the attenuator, the attenuator is retained at a state where the signal is attenuated even after a speech of the near end user ceases, therefore the echo signal having returned to the receiving line can be suppressed without leaving the tail portion thereof Then, when a speech of far end user arrives at the receiving line, a signal attenuation of the attenuator is minimized at the point in time when the beginning is detected, and thus the attenuator works as if it had not been inserted, therefore the far end user's speech can be transferred satisfactorily to the near end user. For control of the attenuator, the attenuator is controlled for a predetermined period on the attenuation control signal at the time when the beginning of speech is detected, the attenuation control signal generated during the period is held temporarily in a storing means such as shift register or the like, and thus the attenuator may be controlled on a control signal obtained from the storing means after the aforementioned period of time passes.

The foregoing and other objects, advantages, manner of operation and novel features of the present invention will be understood from the following detailed description when read in connection with the accompanying drawings.

DESCRIPTION OF PREFERRED EMBODIMENTS

For easy understanding of the invention, a construction and operation of a prior art echo suppressor will be described first with reference to FIG. 1 and FIG. 2.

Figure 1:
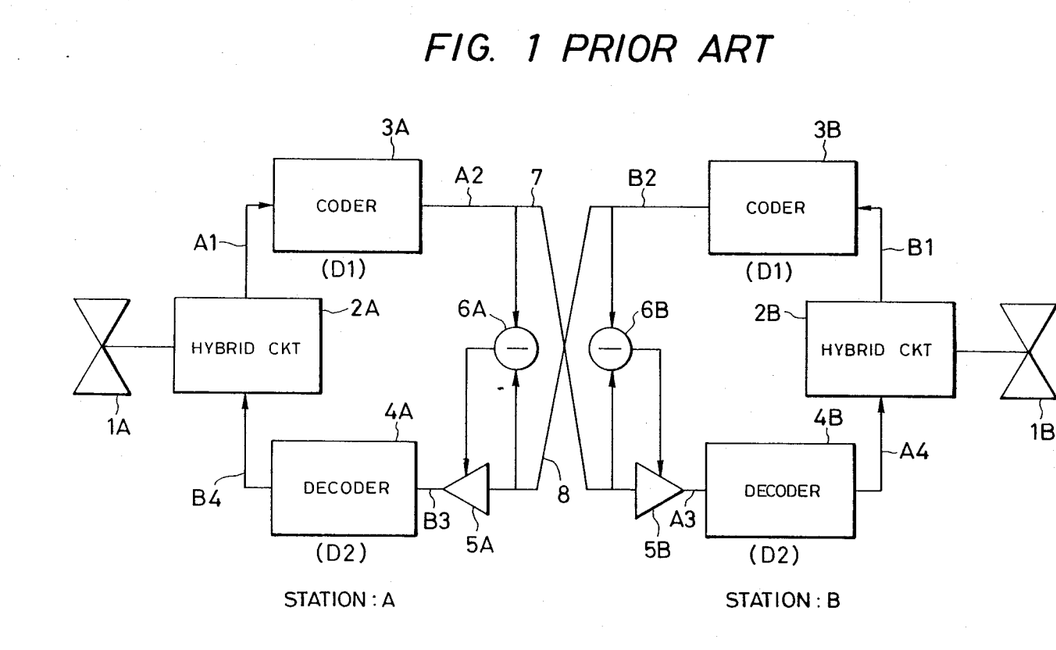
FIG. 1 is a block diagram of a prior art low bit rate speech transmission system.
Figure 2:
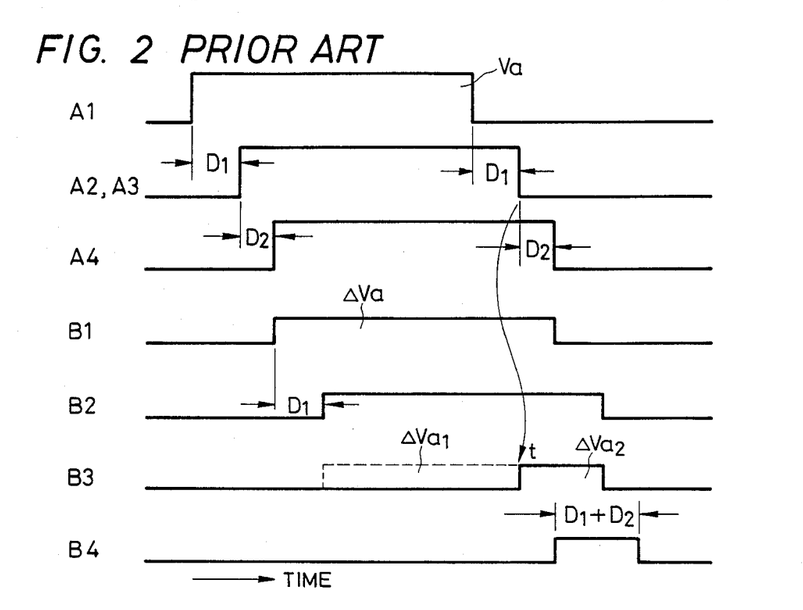
FIG. 2 is a signal time chart for illustrating a speech signal and an echo signal in the prior art system.

In FIG. 1 representing a low bit rate speech transmission system, 1A and 1B denote telephones, 2A and 2B denote hybrid circuits, 3A and 3B denote coders, 4A and 4B denote decoders, 5A and 5B denote attenuators, 6A and 6B denote comparators outputting a control signal for setting attenuations of the attenuators 5A, 5B either at zero or at a predetermined value according to a magnitude of level (amplitude) of each speech signal on signal lines 7, 8 respectively. Since each speech signal transmitted through the signal lines 7, 8 is encoded by the coders 3A, 3B, the comparators 6A, 6B compare levels of the two speech signals according to an amplitude information extracted from the coded signals.

In the aforementioned transmission system, an analog speech signal A1 output from the telephone 1A on a station A side and passing through the hybrid circuit 2A is coded by the coder 3A, and a coded speech signal A2 is transmitted to a station B by way of the signal line 7. The speech signal A2 having reached the station B is inputted to the decoder 4B through the attenuator 5B, and a decoded analog speech signal A4 is inputted to the telephone 1B through the hybrid circuit 2B. Similarly, a speech signal generated from the telephone 1B of the station B reaches the telephone 1A of the station A through paths indicated by symbols B1, B2, B3, B4. The speech signal A4 of the station A having reached the station B partly turns round to a transmitting line side due to an impedance mismatching at the hybrid circuit 2B and returns to the receiving line 8 of the station A as an echo signal by way of the paths similar to the speech signal generated from the telephone 1B.

The comparator 6A compares a level (amplitude) of the speech signal A2 sent from the transmitting line 7 with a level of the speech signal B2 on the receiving line 8, and while the level of the signal A2 is greater than that of B2, it attenuates (echo suppressing) the receiving signal B2 with the attenuator 5A kept inserted.

In the prior art, the attenuator 5A was changed to the state where the attenuation is zero at the point in time when the level of the transmitting speech signal A2 becomes smaller than the level of the receiving speech signal B2. However, signal delay times D1 and D2 which are not negligible are unavoidable to the coders 3A, 3B respectively, and the decoders 4A, 4B, therefore the signals A1 to A4 and B1 to B4 under the state where, for example, a user of the station A is in talk with a user of the station B are interrelated as shown in FIG. 2.

That is, the speech signal A1 with an amplitude Va which is output from the telephone 1A of the station A reaches the station B as the speech signal A4 through delays D1, D2 at the coder 3A and the decoder 4B. The echo signal B1 turning round to the receiving line side from the hybrid circuit 2B is subjected normally to an attenuation of 6 to 20 dB or so into a small amplitude $\Delta$Va. The echo signal B1 is subjected to the delay D1 while passing through the coder 3A and then returns to the receiving line 8 as the signal B2 delayed by D1+D2 than the transmitting speech signal A2. Accordingly, if the attenuator 5A is switched to a non-inserted state at a point in time t when the level of the transmitting speech signal A2 becomes smaller than the level of the receiving speech signal, then the echo signal B2 is inputted to the decoder 4A with its tail portion $\Delta$Va$_2$ unattenuated by the length of delay time D1+D2 as indicated by the signal B3, which develops to the analog speech signal B4 to output to the telephone 1A. That is, a disadvantage is that a user of the station A hears an echo sound corresponding to the tail of speech every time his utterance is interrupted.

Figure 3:
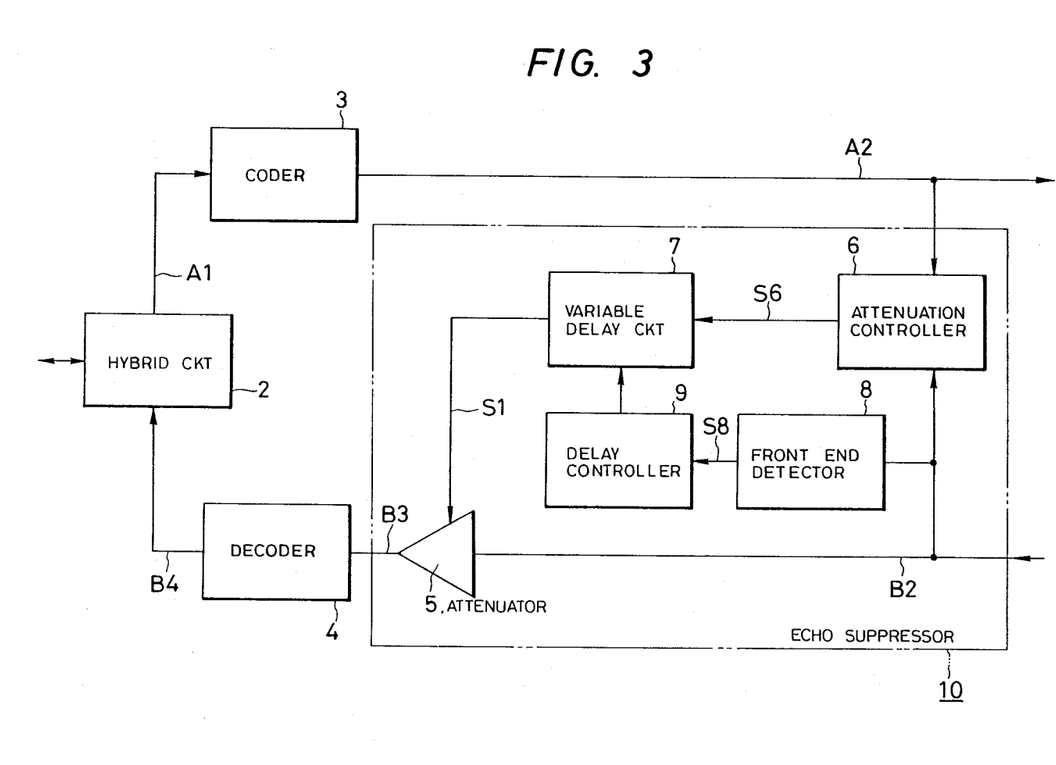
FIG. 3 is a block diagram showing a basic configuration of an echo suppressor according to the invention.

FIG. 3 shows a construction of an echo suppressor 10 according to the invention, thereby solving the problem prevailing hitherto as described. The echo suppressor 10 comprises a circuit 6 (corresponding to comparators 6A, 6B of FIG. 1) for comparing an amplitude of the transmitting speech signal A2 with an amplitude of the receiving speech signal B2 and outputting an attenuation control signal S6 according to a result obtained through the comparison, a variable delay circuit 7 for delaying the attenuation control signal S6, an attenuator 5 having the attenuation controlled by an output signal S7 of the delay circuit 7, a detector 8 for monitoring a change in state of the receiving speech signal B2 and detecting the beginning of a received speech, and a delay control circuit 9 for controlling a delay of the variable delay circuit 7 according to an output signal S8 of the detector 8. The variable delay circuit 7 outputs the attenuation control signal S6 at zero in delay by a predetermined period of time when the detector 8 detects the beginning of a received speech, and then outputs the control signal S7 thereafter by delaying the signal S6 in terms of D1+D2 or somewhat longer than that.

According to the invention, a period for operation of the attenuator 5 is extended by the variable delay circuit 7, and an echo can be suppressed by the attenuator 5 during the period D1+D2 even after the near end user finishes talking. When the beginning of a received speech is detected, the variable delay circuit transfers the attenuation control signal S6 to the attenuator 5 without delay.

Accordingly, where the receiving speech signal B2 is an echo signal, the attenuator 5 can start an echo suppressing operation from the beginning of an echo speech, but where the receiving speech signal B2 is a voice of the far end user, the attenuator 5 is switched to a non-attenuated state from the point in time when the beginning of speech is received, and the received speech can be inputted to the decoder 4 without having the beginning interrupted thereby.

Figure 4:
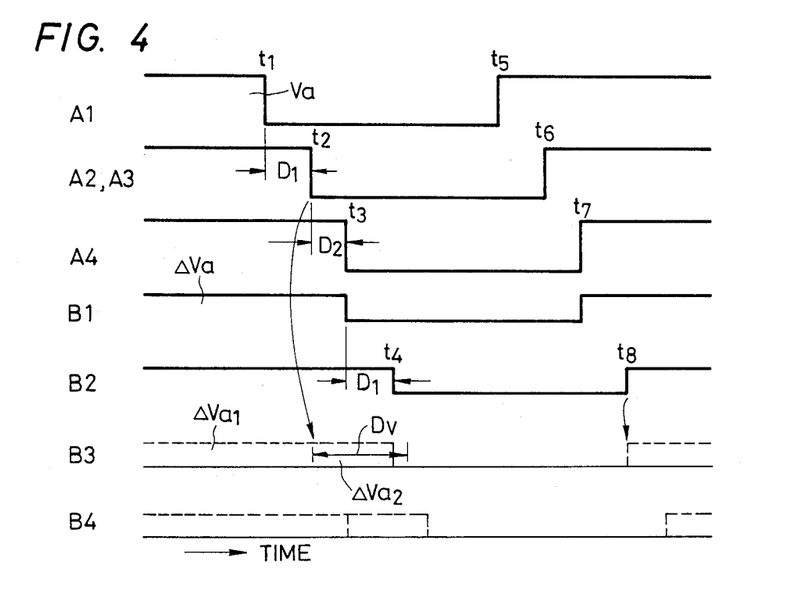
FIG. 4 is a signal time chart showing a signal waveform of each part when a near end user is in talk in a low bit rate speech transmission system to which the echo suppressor of the invention is applied.
Figure 5:
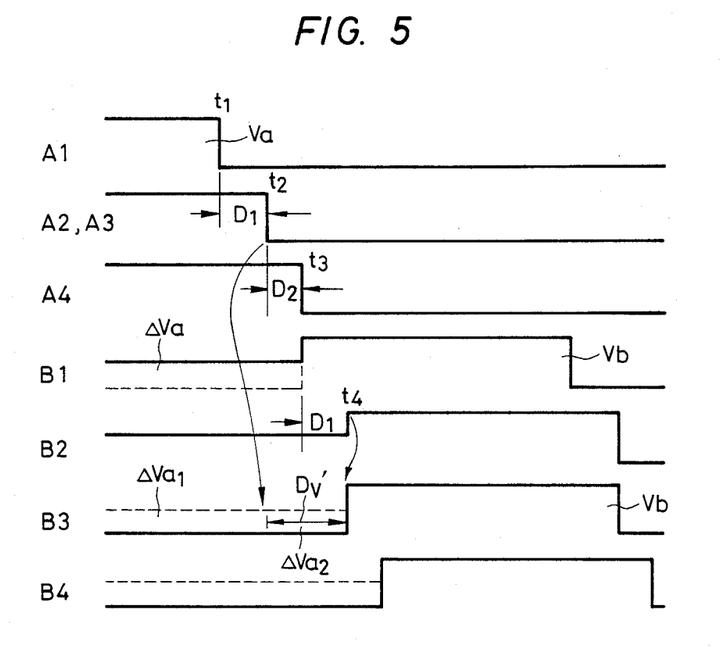
FIG. 5 is a signal time chart showing a signal waveform of each part when near end user and far end user are in talk alternately in the low bit rate speech transmission system to which the invention is applied.
Figure 6:
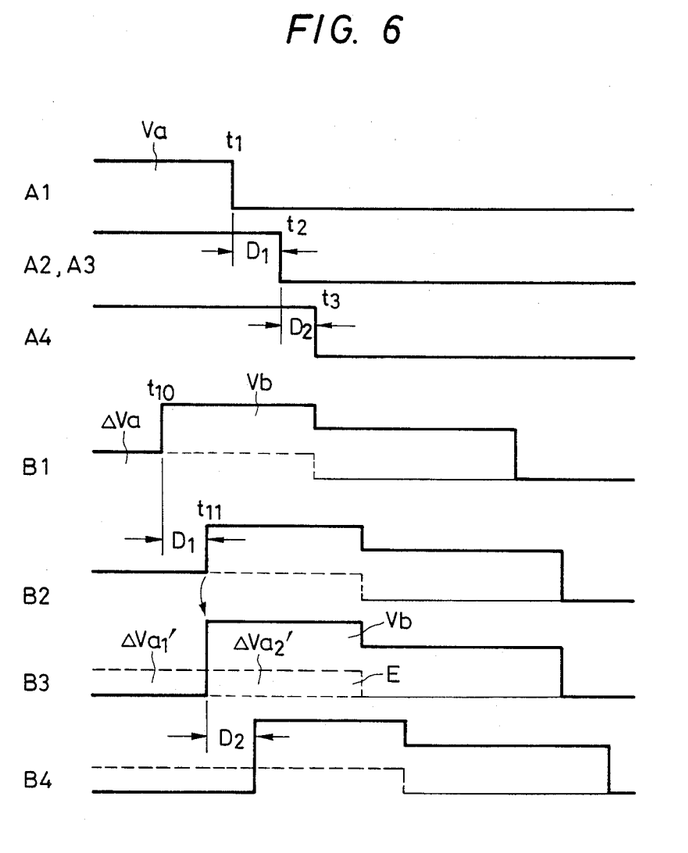
FIG. 6 is a signal time chart showing a signal waveform of each part when near end user and far end user are in talk in superposition in the low bit rate speech transmission system to which the invention is applied.

FIG. 4 to FIG. 6 are time charts of speech signals when the above-described echo suppressor 10 is employed for the low bit rate speech transmission system of FIG. 1.

FIG. 4 indicates a mode of signal transmission at the tail and beginning portions of a speech signal generated by a user of the station A while a user of the station B keeps silent. The attenuation control circuit 6 compares the transmitting speech signal A2 with the receiving speech signal B2 which is an echo thereof, and sets the control signal S6 at "1" so as to keep the attenuator 5 inserted as long as A2 is greater than B2 but sets S6 at "0" for the period other than that. The control signal S6 changes from "1" to "0" at a point in time $t_2$ when the sent speech A2 is interrupted, however, since the delay circuit 7 has already been set to have a delay Dv equal to D1+D2 at this point in time, the attenuator 5 is kept inserted until $t_4$ whereat a tail portion of the receiving speech signal B2 is received thoroughly. Accordingly, the tail portion $\Delta Va_2$ of the echo signal having reached the decoder free in the prior art system is suppressed thoroughly according to the invention. On the other hand, the variable delay circuit 7 has the delay set at zero at a point in time $t_8$ when the beginning of the receiving speech signal B2 is detected, and then operates output the control signal delayed by Dv after a predetermined time passes, therefore the beginning portion of the echo signal is also suppressed thoroughly. Accordingly, an echo component does not come out on the input signal B3 to the decoder.

FIG. 5 indicates a state of speech signals when a user of the station B begins to talk immediately after a user of the station A finishes talking. In this case, the echo component $\Delta Va$ of the speech signal A1 and a speech signal component Vb uttered by the station B user are included in the receiving speech signal B2 of the station A. The variable delay circuit 7 keeps the attenuator 5 inserted until the detector 8 detects a sharp change from the echo component $\Delta Va$ to the speech signal component Vb, therefore a tail of the echo component is suppressed thoroughly. Then, since the attenuator 5 is switched to a non-inserted state at a point in time $t_4$ when the speech signal component Vb arrives, a sent speech of the station B user may reach a telephone of the station A without the beginning being interrupted.

FIG. 6 indicates a state of speech signals when the station B user begins to talk while the station A user is in talk. In this case, the receiving speech signal B2 has the echo component $\Delta Va$ superposed partly by the speech signal component Vb of the station B user. The attenuator of the station A is switched from an inserted state to a noninserted state at a point in time when the speech signal component Vb of the station B user is detected, therefore a tail portion $\Delta Va'_2$ of the echo component will be decoded together with the speech signal component Vb of the station B user, however, since an amplitude of the echo component $\Delta Va'_2$ is much smaller than Vb, an influence to be exerted on the station A user by the echo component can be almost neglected in this case.

Figure 7:
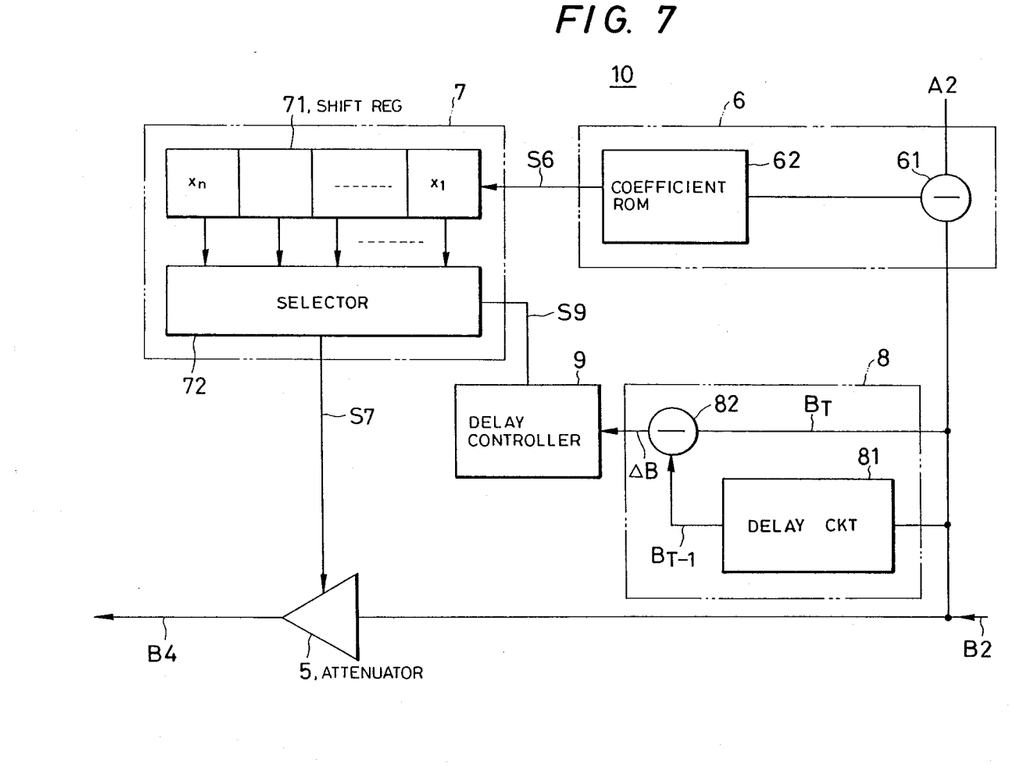
FIG. 7 is a block diagram representing an echo suppressor given in one embodiment of the invention.

FIG. 7 represents one embodiment of the echo suppressor 10 according to the invention. The attenuation control circuit 6 comprises a comparator (subtractor) 61 for comparing an amplitude information included in the transmitting speech signal A2 with an amplitude information included in the receiving speech signal B2, and outputting a value corresponding to the amplitude difference, and a coefficient ROM 62, a command value S6 read out of ROM 62 according to a comparison result being inputted to the delay circuit 7. The delay circuit 7 in the example comprises a shift register 71 and a selector 72 for selecting outputs of the shift register. The detector 8 is constituted of a delay circuit 81 for delaying the coded receiving speech signal B2 by one frame duration, and a subtractor 82 for determining a difference $\Delta B$ ($=B_T-B_{T-1}$) between an amplitude information $B_{T-1}$ of the speech signal output from the delay circuit 81 and an amplitude information BT of a speech signal frame newly received. The delay control circuit 9 receives the output $\Delta B$ of the subtractor 82 and gives the selector 72 a control signal S9 for zeroizing the delay when a value of $\Delta B$ is greater than a predetermined threshold (or when the beginning of speech is detected).

The number of stages of the shift register 71 is designed so that the time required for the command value S6 inputted to a first stage $X_1$ to reach a final stage Xn will almost coincide with the foregoing delay time D1+D2. Upon receipt of the control signal S9 for zeroizing the delay, the selector 72 selects a content of the first stage $X_1$ of the shift register to output to the attenuator 5. If the selector 72 is arranged to shift the stage to select successively after selection of the first stage $X_1$ and keep a selection of the final stage Xn until the next control signal S9 is inputted, then the attenuator 5 can be made to operate for suppression thoroughly as far as the tail of the echo component without interrupting the beginning of a received speech. When the control signal S9 is given, the selector 72 may select an output of the first stage $X_1$ for a predetermined period of time otherwise, and then select on output of the final stage Xn thereafter.

Figure 8:
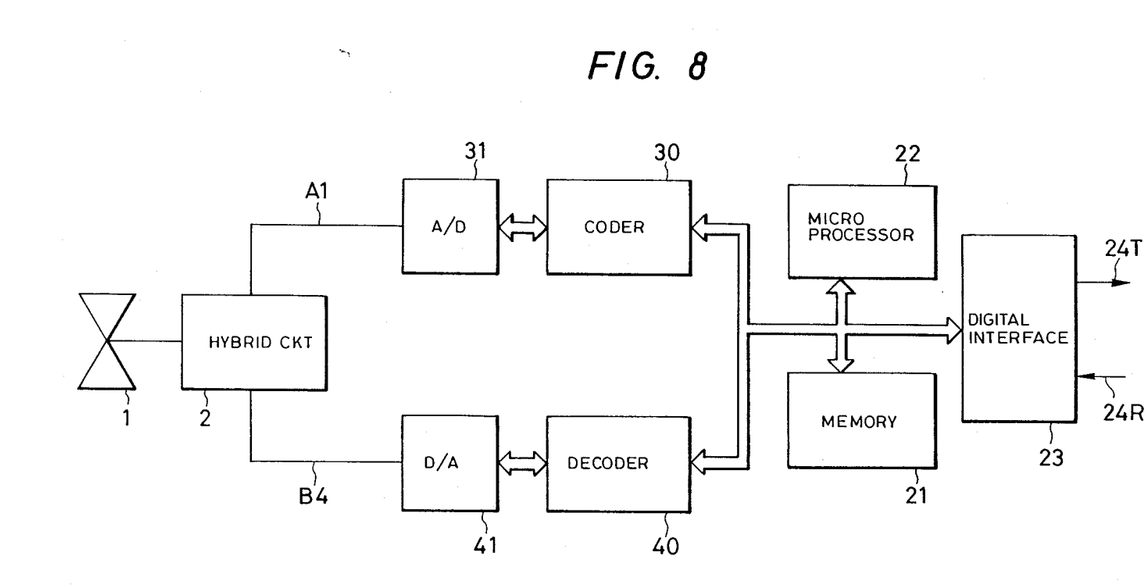
FIG. 8 is a block diagram representing an echo suppressor given in another embodiment of the invention.

FIG. 8 represents another embodiment of the invention.

The embodiment is that for which function of each element in FIG. 7 is realized by software of a microprocessor.

The analog speech signal A1 output from a telephone 1 is inputted to an A/D converter 31 through a hybrid circuit 2, converted thus into a digital signal and then coded by a coder. The speech signal is coded, for example, from being converted into various parameters known as PACOR coefficients. The parameters are loaded in a memory 21 by a microprocessor 22 or an exclusive access controller (not illustrated), edited to a data frame in predetermined format and then transferred to a digital interface 23. The interface 23 converts the data frame into a serial signal and sends to a transmitting line 24T.

A speech signal from other stations is inputted to the digital interface 23 through a receiving line 24R, converted into a parallel data and then fetched in the microprocessor 22. The microprocessor reproduces a speech parameter from the received data, loads it in the memory 21 and then outputs to a decoder 40 in a predetermined timing. The decoder 40 decodes a digital speech signal from coded data denoted by various kinds of parameters and gives it to a D/A converter 41. The speech B4 converted into an analog signal by the D/A converter 41 is put out to the telephone 1 by way of the hybrid circuit 2.

In the aforementioned construction, the microprocessor 22 compares a maximum amplitude information of a residual waveform which is one of the parameters included in the data received from the digital interface 23 with a maximum amplitude information of a residual waveform included in the transmitting speech the data loaded in the memory 21, and changes an amplitude parameter of the data with a smaller amplitude to minimize the amplitude level.

In this case, a coefficient value corresponding to the attenuation is stored beforehand in a coefficient table provided in the memory 21 to coordinate with an amplitude difference between the two signals transmitted and received, and the attenuation coefficient is read out of the coefficient table every time the transmitted speech and the received speech are compared. The coefficient thus read out is written successively in a register area provided in the memory 21 which coordinates with the shift register of FIG. 7. On the other hand, every time a new received speech data is given by the interface 23, it is compared with the speech data already received for amplitude, thereby detecting the beginning of speech. A position whereat a coefficient from the register area is read is changed according to whether or not the beginning of speech is detected and an amplitude parameter of the received speech is multiplied by the attenuation coefficient read out. Functions of the elements 5, 6, 7, 8 of FIG. 7 can be realized by the microprocessor 22 through aforementioned data processings.

Embodiments in the case of speech signals is described in detail as above, however, the invention is not necessarily limited to speech signals in the scope of application, and it can be applied extensively, needless to say, to digital communication, image communication and other various kinds of signal communications.

We claim:

1. An echo suppressor, comprising:
    a means for coding a speech signal to output as a transmitting speech data which is provided on a sending line;
    a means for decoding a coded receiving speech data which is provided on a receiving line;
    a means for attenuating a speech amplitude level of the receiving speech data to be inputted to said decoding means;
    a means for outputting an attenuation control signal for controlling a signal attenuation of said attenuating means according to a result obtained through comparing a speech amplitude level of said transmitting speech data with a speech amplitude level of said receiving speech data;
    a means for detecting whether or not the receiving speech data corresponding to the beginning of speech is inputted to said receiving line;
    a means for controlling the delay time until said attenuation control signal operates on said attenuating means according to an output of said detecting means so as to minimize said delay time when said detecting means detects said receiving speech data corresponding to the beginning of speech, and to maximize said delay time after a lapse of a predetermined duration from the detection of a received data corresponding to the beginning of said speech wherein the maximum value of said delay time is decided according to the value of a signal delay time until an echo component of said transmitting speech data is received on said receiving speech data.

2. The echo suppressor as defined in claim 1, wherein said delay time control means sets said delay time to a predetermined maximum value after the lapse of a predetermined duration from the detection of a received data corresponding to the beginning of said speech.

3. The echo suppressor as defined in claim 2 wherein the maximum value of said delay time is decided according to the value of a signal delay time until an echo component of said transmitting speech data is received on said speech data.

4. An echo suppressor, comprising:
    a means for coding a speech signal to output as a transmitting speech data which is provided on a sending line;
    a means for decoding a coded receiving speech data which is provided on a receiving line;
    a means for attenuating a speech amplitude level of the receiving speech data inputted to said decoding means;
    a means for outputting an attenuation control signal for controlling a signal attenuation of said attenuating means according to a result obtained through comparing a speech amplitude level of said transmitting speech data with a speech amplitude level of said receiving speech data;
    a means for detecting whether the receiving speech data corresponding to the beginning of speech is inputted to said receiving line;
    a means for controlling a delay time for the outputting means for the attenuation control signal having a multistage signal delay means for outputting from each stage to provide successive delays to the attenuation control signal given by said outputting means; and,
    a selecting means for selecting an output of the first stage of said signal delay means, when said speech data corresponding to the beginning of speech is received, and successively shifting said output stage for obtaining a constant attenuation control signal, before said attenuation control signal on said first stage reaches the last stage of said signal delay means, and selecting the output of the last stage after said attenuation control is reached to the last stage.

5. The echo suppressor as defined in claim 4, wherein said attenuating control signal outputting means outputs said attenuation control signal so as to decrease said attenuation while the amplitude level of the transmitted signal is smaller than that of the received signal and to increase the attenuation otherwise.

6. The echo suppressor as defined in claim 4, wherein a maximum value of said delay time is decided according to a value fo a signal processing delay time comprising a total speech data of a transmitting and receiving time.

* * * * *